H. A. SEVIGNE & F. K. ARNOLD.
WRAPPING MACHINE.
APPLICATION FILED APR. 4, 1914.
1,253,636.
Patented Jan. 15, 1918.
12 SHEETS—SHEET 8.
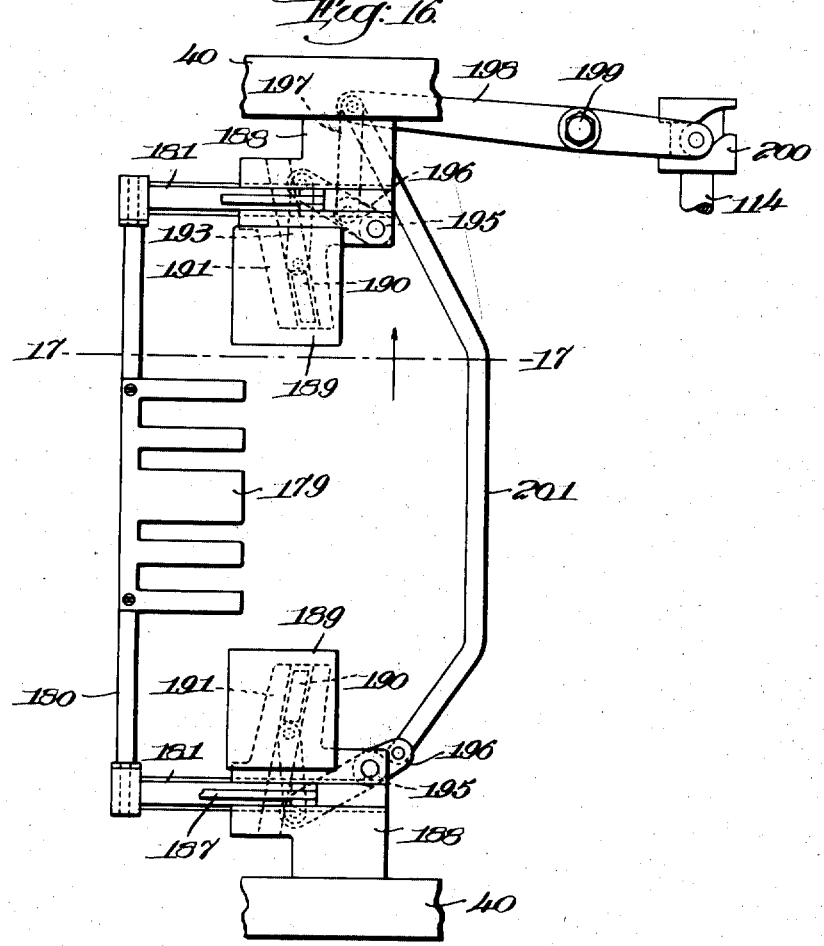
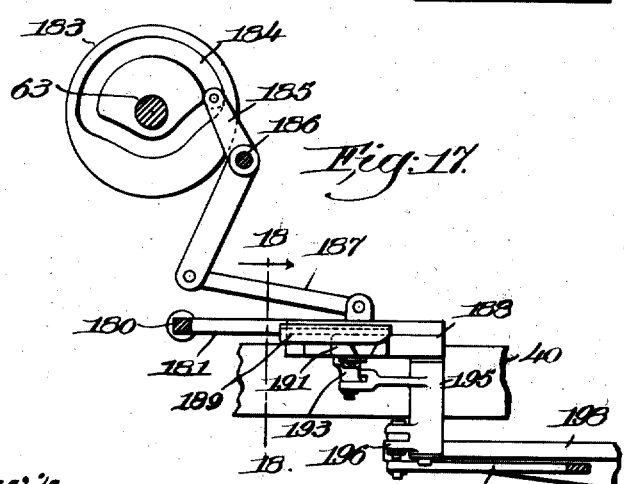
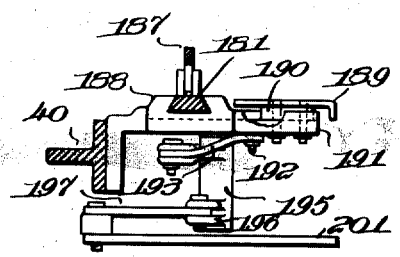

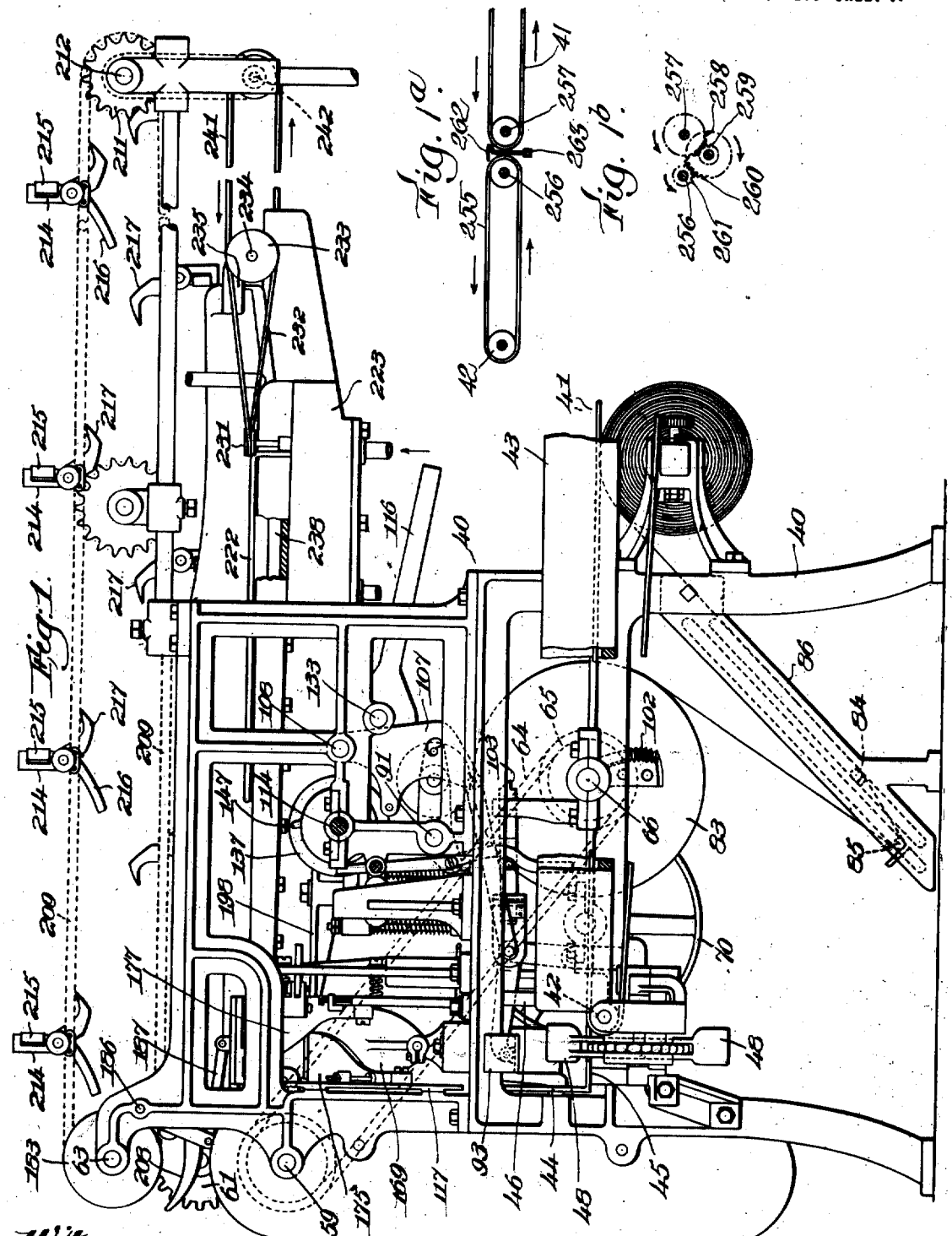

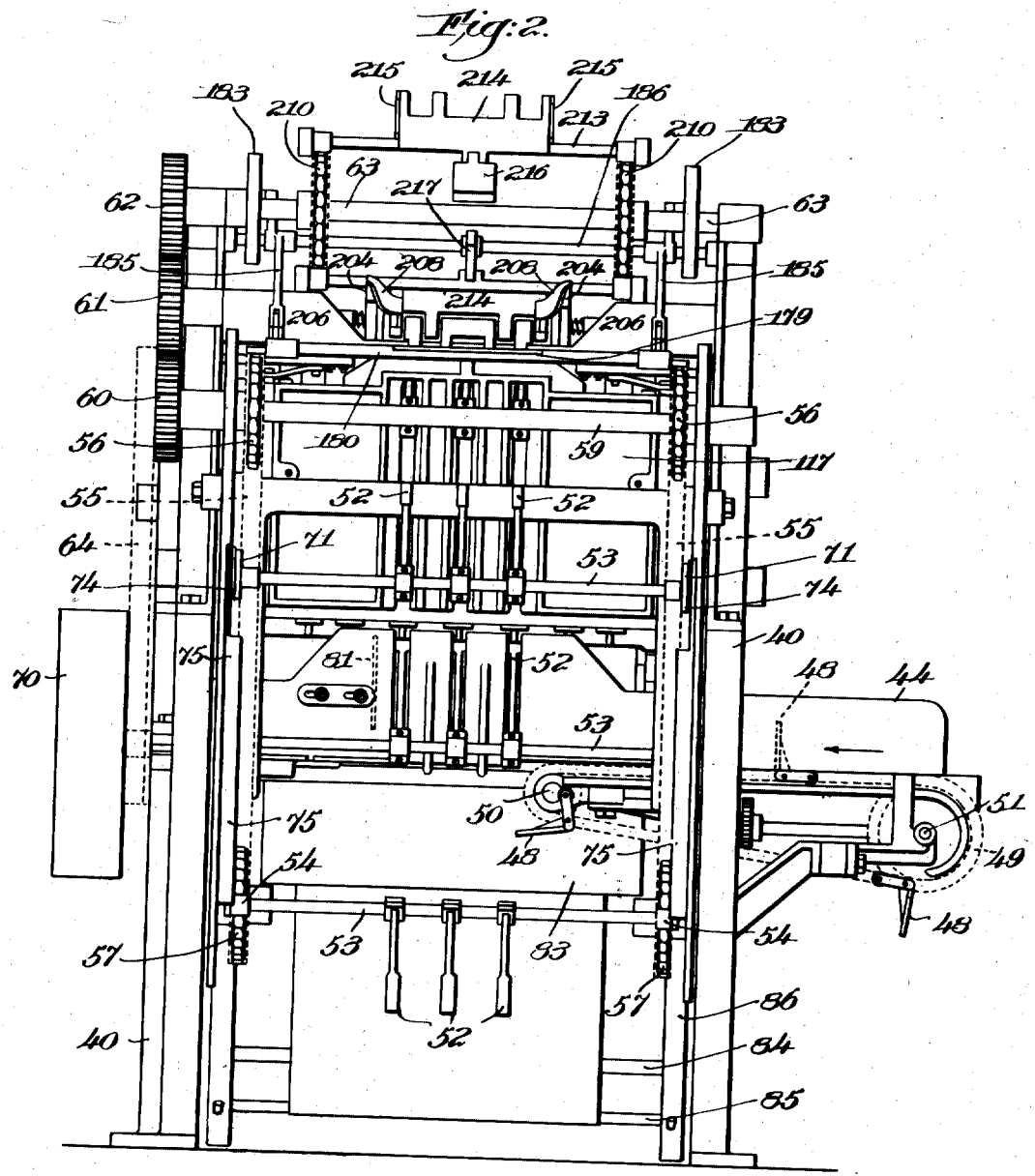

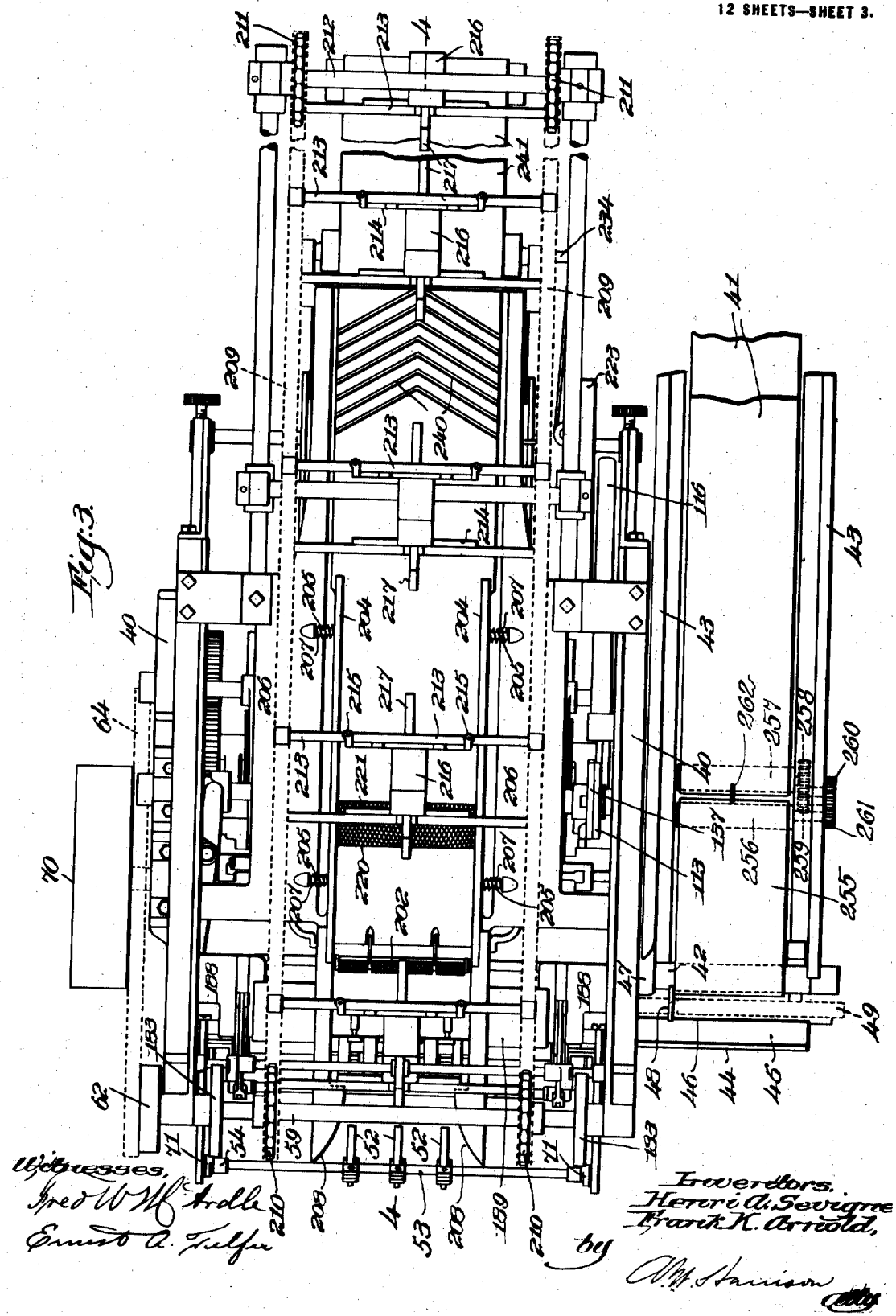

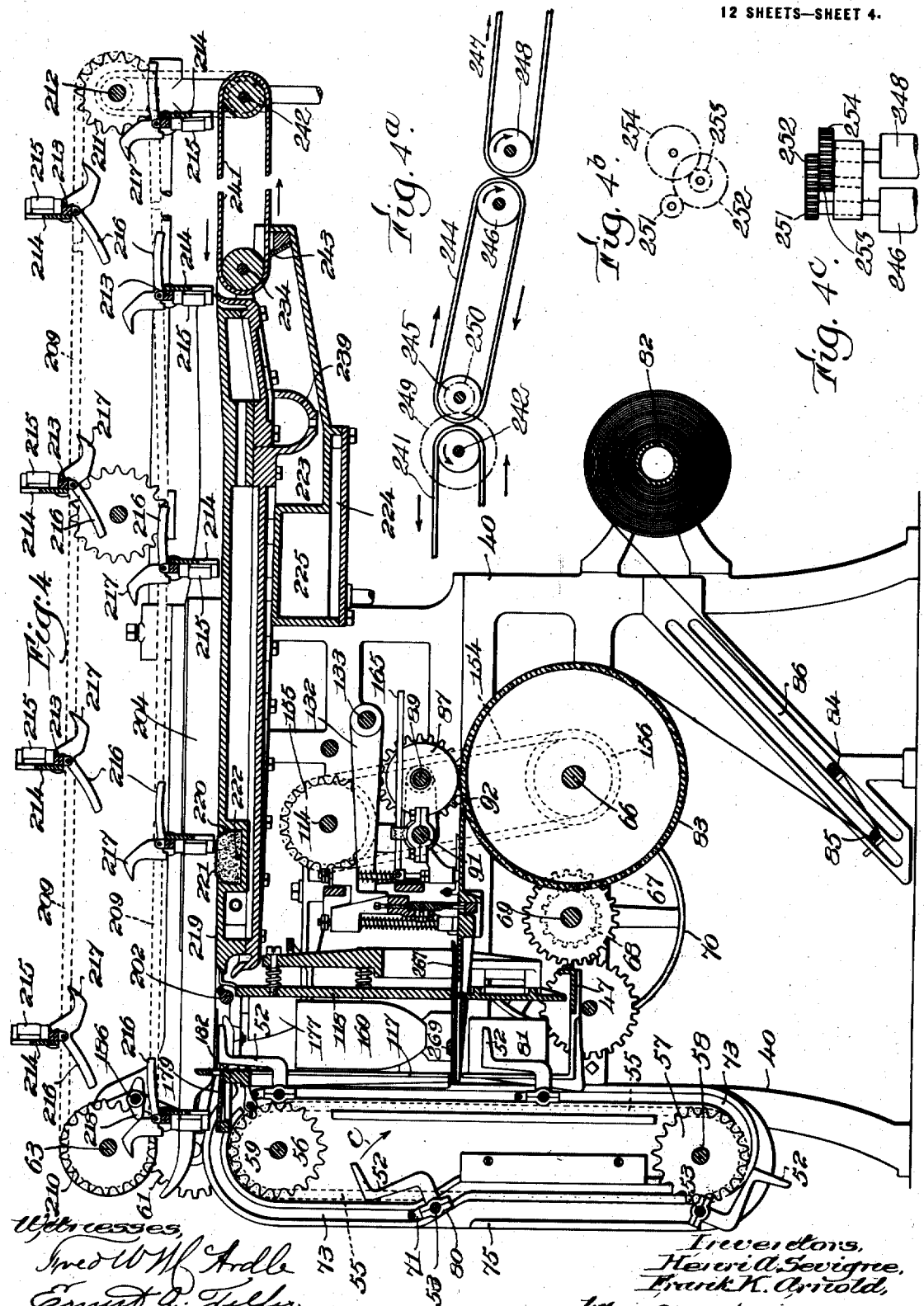

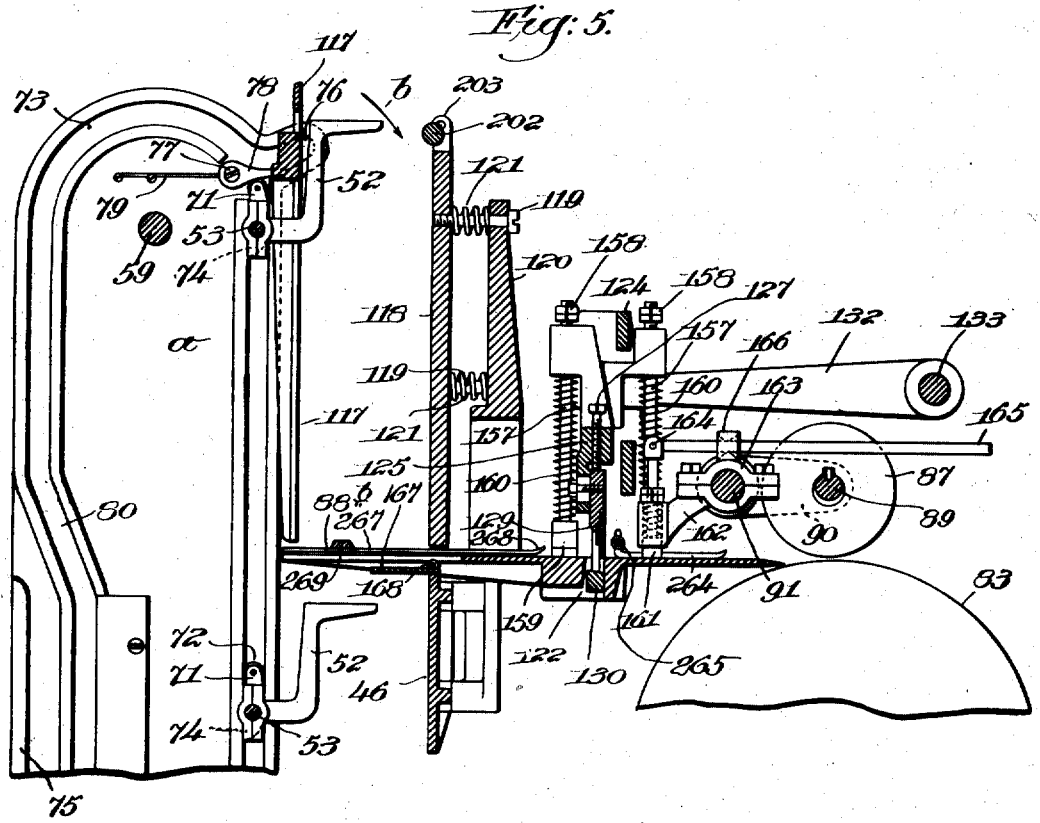

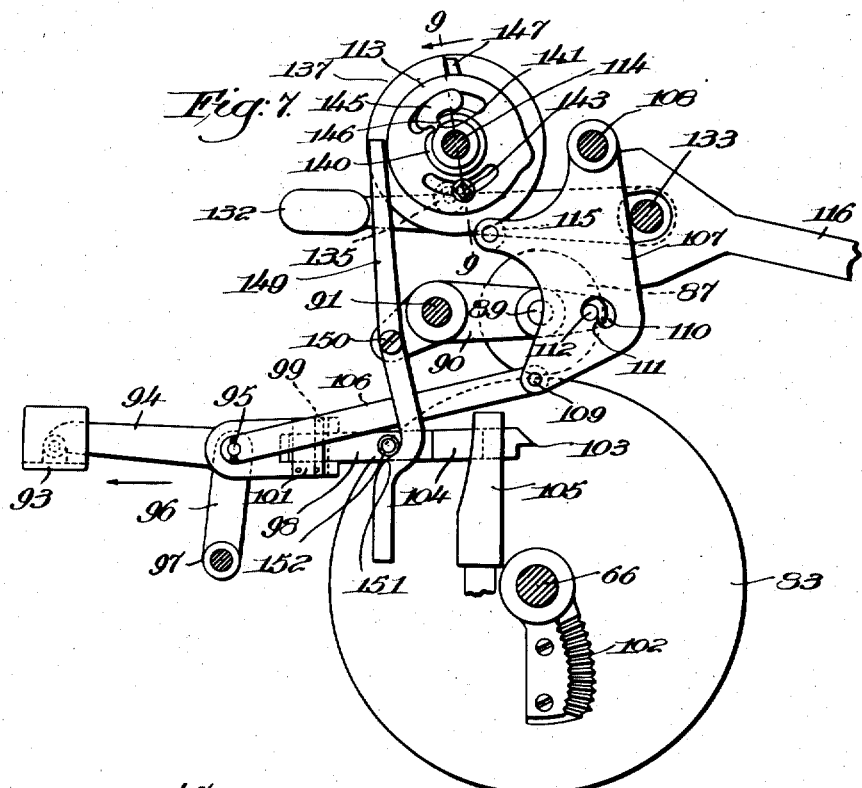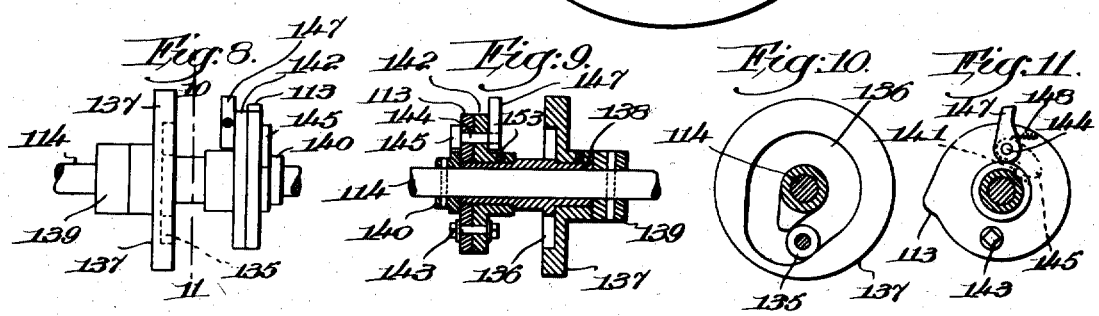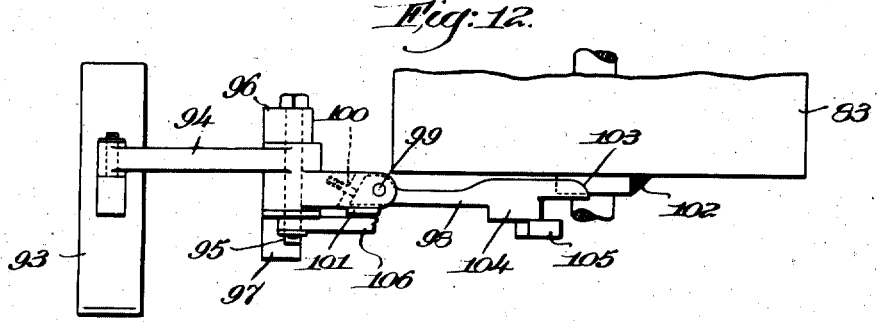

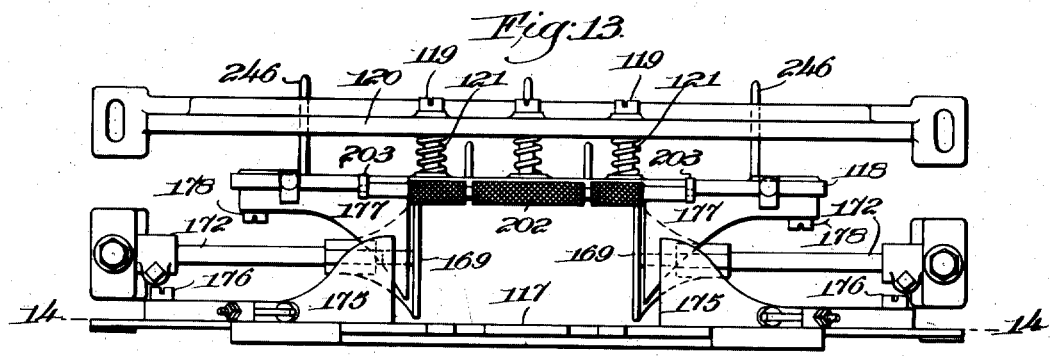

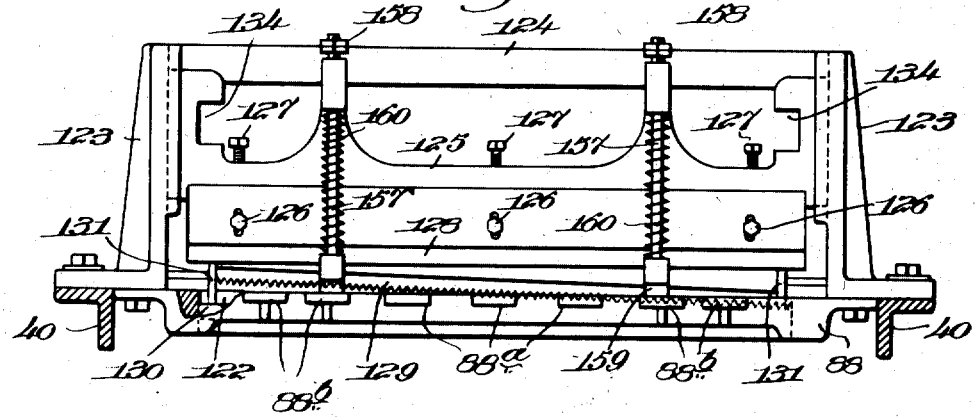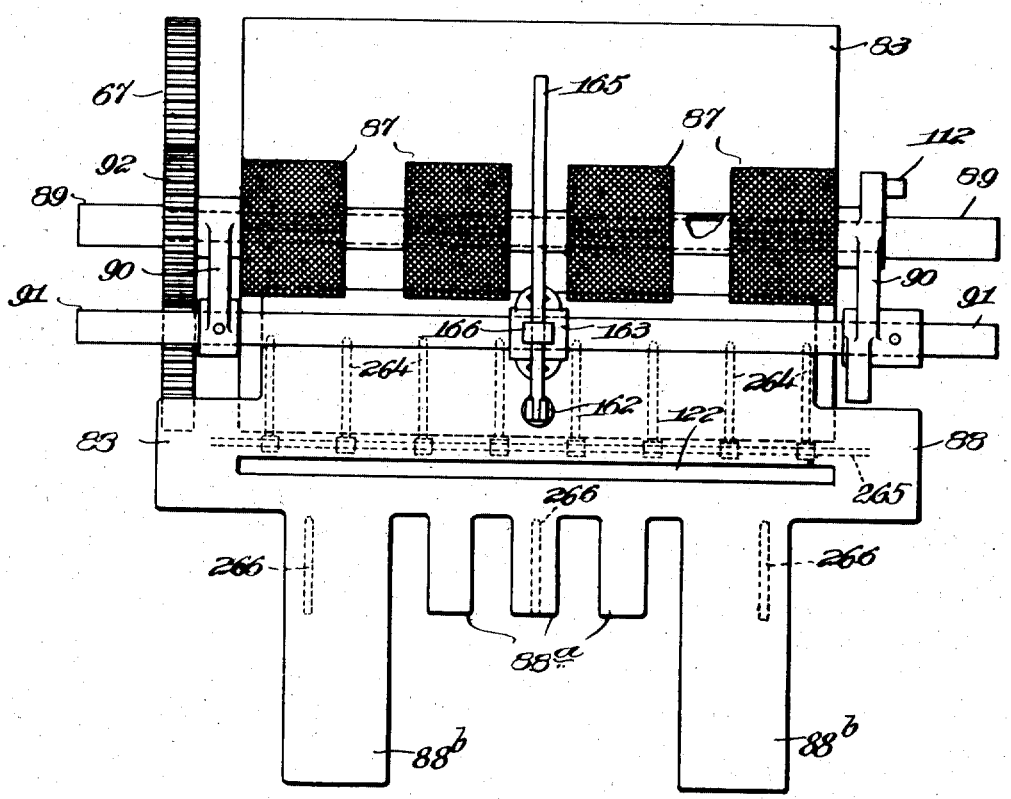

H. A. SEVIGNE & F. K. ARNOLD.
WRAPPING MACHINE.
APPLICATION FILED APR. 4, 1914.
1,253,636.
Patented Jan. 15, 1918.
12 SHEETS—SHEET 10.
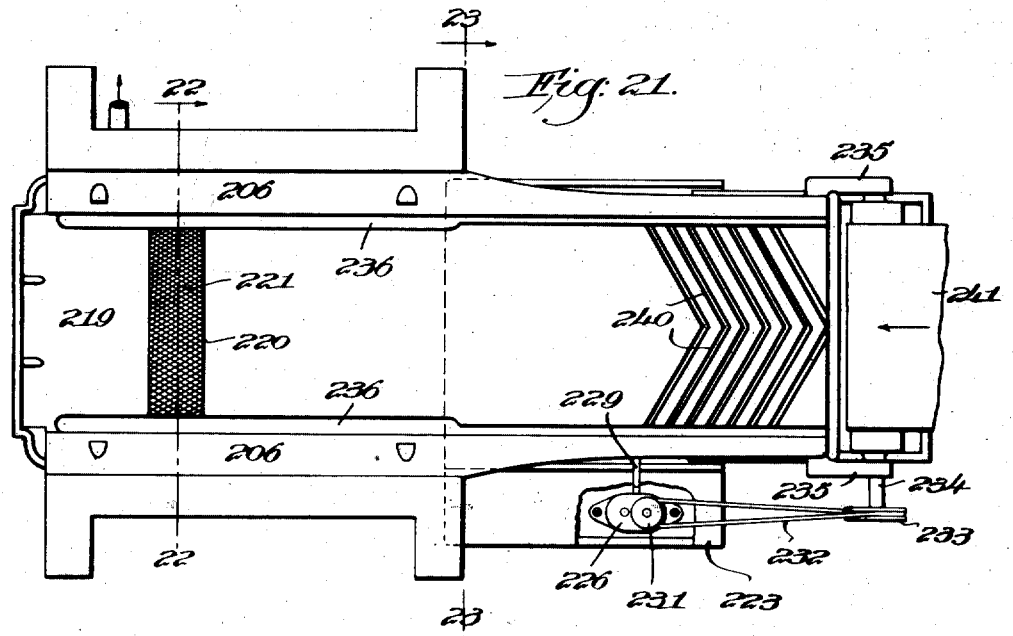
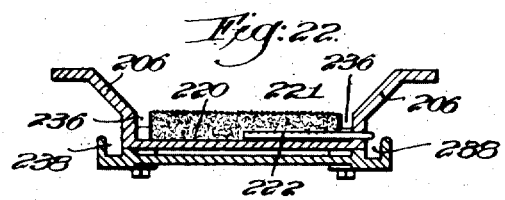
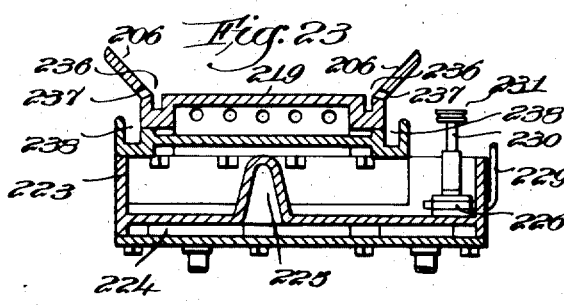
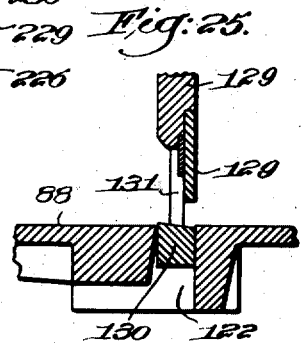
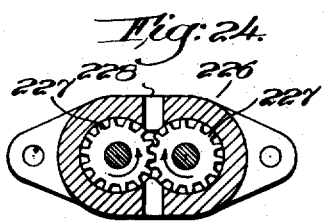

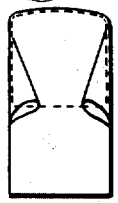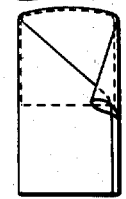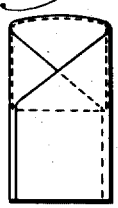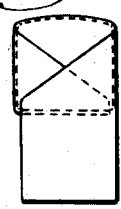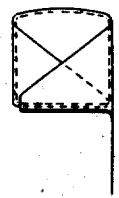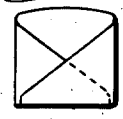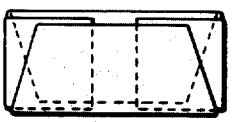

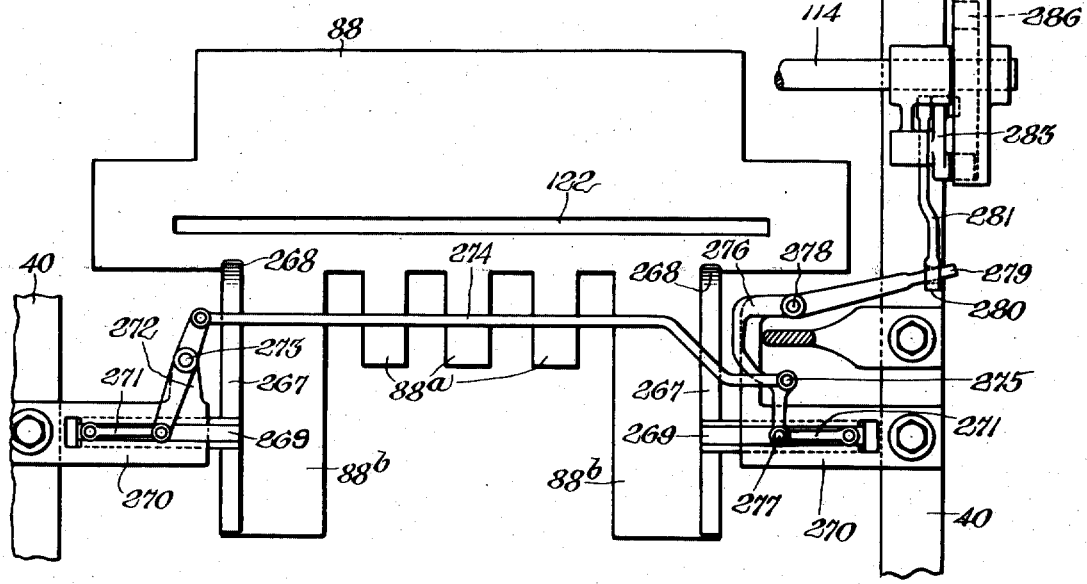

UNITED STATES PATENT OFFICE.

HENRI A. SEVIGNE, OF WINTHROP, MASSACHUSETTS, AND FRANK K. ARNOLD, OF NASHUA, NEW HAMPSHIRE, ASSIGNORS, BY DIRECT AND MESNE ASSIGNMENTS, OF FORTY-FIVE ONE-HUNDREDTHS TO SAID SEVIGNE AND FIFTY-FIVE ONE-HUNDREDTHS TO CARTER, RICE & COMPANY, OF BOSTON, MASSACHUSETTS, A CORPORATION OF MASSACHUSETTS.

WRAPPING-MACHINE.

1,253,636.     Specification of Letters Patent.     Patented Jan. 15, 1918.

Application filed April 4, 1914. Serial No. 829,591.

*To all whom it may concern:*

Be it known that we, HENRI A. SEVIGNE and FRANK K. ARNOLD, citizens of the United States, and residents, respectively, of Winthrop, in the county of Suffolk and State of Massachusetts, and of Nashua, in the county of Hillsboro and State of New Hampshire, have invented certain new and useful Improvements in Wrapping-Machines, of which the following is a specification.

This invention relates to wrapping machines and has particular reference to machines adapted to wrap articles which vary more or less in shape or size, or are quite irregular in form.

The present machine is similar in principle and operation to that described and claimed in Letters Patent 1,117,260 granted November 17, 1914 to Henri A. Sevigne.

One of the objects of the invention is to provide a machine of this character which is adapted to use waterproof paper of a character known as "dry" paper, or but slightly waxed, so as to not soil the clothing of a person carrying the wrapped articles. A further object is to provide a machine adapted to so seal the wrapped article as to render it unnecessary to employ wrapping paper carrying such a quantity of paraffin as to perform the sealing operation.

Another object is to provide a simplified construction of folding mechanism, especially those parts which fold the end portions.

A further object is to provide a wiper device which insures the delivery of the wrapped articles with a smoothly sealed surface.

Another object is to provide means whereby the wrapping material will be delivered in automatically straightened condition without the employment of side guides.

Another object is to provide means for preventing the edge of the advancing web of paper from being caught upon any of the cutting mechanism if said edge should be ragged.

Another object is to provide an improved construction of feed mechanism employing loosely mounted upper feed rolls to allow for creases or other causes of local differences in thickness of the wrapper material.

Another object is to provide improved means for preventing deflection of the wrapper material as it advances across the passageway for the loaf preliminary to being cut and assembled with the loaf.

Another object is to provide mechanism for automatically presenting the loaves to the machine without liability of a loaf at the head of a series of loaves being crushed by the pressure of those behind it.

Another object is to provide improved means for discharging the wrapped loaves from the machine in uniform disposition.

Further objects of the invention are to provide improvements in the sealing mechanism and in the folders or tuckers which we shall describe hereinafter.

Of the accompanying drawings:

Figure 1 is an elevation of the machine, from the side which is referred to as the front because of the relative position of the attendant.

Figs. 1$^a$ and 1$^b$ are detail views hereinafter referred to in connection with the description of the means for preventing crushing of the loaves against the stop wall, before entering the machine.

Fig. 2 is an elevation from the left of Fig. 1.

Fig. 3 is a plan view.

Fig. 4 represents a section on line 4—4 of Fig. 3.

Figs. 4$^a$, 4$^b$ and 4$^c$ are detail views hereinafter referred to in connection with the description of the means for insuring the deposit of the wrapped loaves uniformly on the final delivery carrier.

Fig. 5 is an enlarged sectional detail of a portion of Fig. 4.

Fig. 6 is a view similar to a portion of Fig. 5 but illustrating the parts in a different position.

Fig. 7 is an enlarged detail of some of the mechanism illustrated in Fig. 1.

Fig. 8 is a detail elevation of the mechanism shown at the top of Fig. 7, looking toward the right.

Fig. 9 represents a section on line 9—9 of Fig. 7.

Figs. 10 and 11 represent sections on line 10—11 of Fig. 8, looking respectively to the left and right.

Fig. 12 is a detail plan view of some of the mechanism shown in Fig. 7.

Fig. 13 is a detail plan view of some of the mechanism below the parts shown at the left of Fig. 3.

Fig. 14 represents a section on line 14—14 of Fig. 13.

Fig. 15 is an elevation, looking from the right of Fig. 14.

Fig. 16 is a detail plan view of some of the parts shown at the left of Fig. 3 but above the mechanism shown in Fig. 13.

Fig. 17 represents a section on line 17—17 of Fig. 16.

Fig. 18 represents a section on line 18—18 of Fig. 17.

Fig. 19 is a detail elevation of part of the web-cutting mechanism.

Fig. 20 is a top plan view of a part of the web-cutting mechanism.

Fig. 21 is a plan view of the heated wrapper-sealing bed.

Fig. 22 is a section on line 22—22 of Fig. 21.

Fig. 23 is a section on line 23—23 of Fig. 21.

Fig. 24 represents a section on line 24—24 of Fig. 23, on a larger scale.

Fig. 25 is a detail view similar to a portion of Fig. 5, to show the deflector bar in its raised position.

Figs. 26 to 35 inclusive are views to illustrate the progress of the folding operation, the last five figures being side, bottom, end, and top views of the completely wrapped loaf.

Figs. 36 and 37 are detail plan views illustrating the preferred means for preventing deflection of the wrapper material as it is advanced by the feed mechanism preparatory to being cut off and assembled with a loaf.

Fig. 38 is a detail elevation of the mechanism for actuating the deflection-preventing guides.

Similar reference characters indicate similar parts in all the views.

The main frame 40 of the machine comprises two side members and suitable tie-rods or bars. A carrier belt 41 for the loaves to be wrapped is supported adjacent the front of the machine and is mounted at one end on a roll 42 and may be of any desired length, the other end of the belt not being illustrated. Suitably supported guides 43 are provided for the ends of the loaves on belt 41 to slide between. As the details of the mechanism for operating this belt form no part of our present invention, the specific mechanism is not illustrated. The belt travels continuously with the loaves in immediate juxtaposition, the front loaf of the advancing row being delivered by the belt against the upright wall 44 having a foot or base 45. The wall 44 forms one side of a chamber which receives each loaf from the belt 41 by mechanism hereinafter described, the opposite wall of said chamber being formed by a plate 46. (Figs. 1 and 14). A longitudinal slot or space is provided between the edge of the foot 45 of wall 44 and the edge of a horizontal plate 47, (Figs. 1 and 3) for the passage of the pushers which transfer loaves singly from the belt 41 onto the foot or base 45 and the plate base 47, which are slotted as presently described, these two last-mentioned members forming the bed along which each loaf is slid by a pusher to position it for the action of the elevating fingers hereinafter described, and which raise each loaf between the folders which turn in the ends of the wrapper. The pushers 48 (Figs. 1, 2 and 3) are carried by a chain 49, indicated by dotted lines in said figures, said chain being carried by pulleys mounted on shafts 50, 51. The pushers project upwardly through the slots hereinbefore mentioned. The chain with its pushers is operated continuously in the direction of the arrow in Fig. 2, by means of connections with the power shafting of the machine, not necessary to describe herein as it forms no part of our present invention.

The chamber between the wall 44 and plate 46 into which the loaves are delivered by the pushers 48 is transversely slotted, as indicated in Fig. 2, to permit the upward passage of the lifting fingers 52, the slots being, of course, also formed in the base portions 45, 47 of said wall 44 and plate 46. The fingers which are the result of such slotting of the base portions, form the floor onto which each loaf is carried by a pusher 48 as already described. Obviously an opening the size of a loaf would permit the loaf to drop through. The fingers prevent this (by forming a floor) while the spaces between the fingers enable the elevating fingers 52 to pass through. As shown by comparing Figs. 2 and 4, the fingers 52 are arranged in series of three, to pass between the fingers of the loaf-receiving floor just described, the three fingers of each series being clamped upon a rod 53 mounted in bearings 54 attached to links of two chains 55, the said chains being mounted on upper and lower sprockets 56, 57. The sprockets 57 are idle and are carried by a shaft 58. The sprockets 56 are connected to rotate with a shaft 59 having a pinion 60 meshing with an idle pinion 61 which in turn meshes with a gear 62 secured to a shaft 63. The shaft 59 also has a sprocket for a chain 64 driven by a sprocket 65, indicated by dotted lines in Fig. 1, on a shaft 66 of the feeding drum hereinafter described. The shaft 66 also has a gear 67 indicated in Fig. 4, said gear meshing with a pinion 68 on the main driving shaft 69, said shaft 69 having a pulley 70 for a driving belt.

As hereinafter described, each loaf, as it is lifted by the fingers 52 between the front and rear walls of the chute or vertical passageway, is brought into juxtaposition with an overlying section of wrapping material such as paper, and the wrapper is folded all but the bottom edges or flaps. It is essential that the fingers, after they have brought each loaf to the upper end of the chute or vertical passageway, shall drop away from the bottom of the loaf. To effect this result each finger-carrying shaft 53 has secured to one or both ends thereof, preferably one at each end, an arm 71. Each arm 71 has a roll 72 (Figs. 5 and 6) traveling in a cam track 73. Each arm 71 also has a toe 74 adapted to engage the upper end of a rib 75 (Fig. 4) for a purpose presently described. As best shown in Fig. 5, the cam track 73 is offset at 76, and pivotally mounted at 77 is a switch cam 78. As each rod 53 rises in the direction of the arrow $a$ in Fig. 5, the rolls 72 contact with the two switch cams 78 and lift them to the position shown in Fig. 5, so that said switch cams act upon the arms 71 to quickly swing the fingers 53 in the direction of the arrow $b$ in Fig. 5, resulting in the dropping of the support for the loaf. As soon as the rolls 72 have passed into the extremities of the cam offsets 76, the switch cams 78 drop, this dropping action being aided by a suitable spring 79. Then as the rod 53 continues to move, the roll 72 rides along the upper face of the switch cam so as to occupy substantially the position shown in Fig. 6. In this position the fingers are practically inverted and it is essential to right them again before they pass under the lower shaft 58. To this end each cam track 73 has an inclined portion 80 which throws the fingers over in the direction of the arrow $c$ in Fig. 4. When this turning movement occurs, the toe 74 of each arm is brought above the upper end of rib 75 so as to insure the complete turning over of the rod carrying the fingers and avoid any liability of the fingers remaining in an intermediate position. After each rod carrying the fingers passes the inclined portions 80, the rolls 72 pass into and follow along portions of the cam track which insures the fingers occupying the position shown at the right in Fig. 4.

Each loaf brought to position by a pusher 48 is stopped by a plate 81 (Figs. 2 and 4), it being understood, of course, that each pusher after it advances a loaf against the plate 81 passes downwardly over the axis of the shaft 50.

The paper from which wrapper sections are severed is inserted horizontally across the vertical chute or passageway above each loaf, so as to be draped over the loaf as it is carried upwardly by fingers 52, it is fed from a roll on a suitably mounted core 82, the paper then passing under two gravity rolls on its way to the feed drum 83. The operation of the feeding mechanism is intermittent, as hereinafter described. Two gravity rolls 84, 85 (Figs. 1 and 4) are guided at their ends in inclined ways 86. The rolls 84, 85 are removable so that rolls of different weight may be substituted one for another. The object of the two rolls is to compensate for the gradually reducing size and inertia of the roll of paper on the core 82. When a large roll of paper is in place, it requires more weight to draw off the loop of paper between the roll and the drum 83 than when the roll is small. When the feeding mechanism acts and takes up some of the loop of paper, if the roll 85 is insufficient to exert an unwinding pull upon the web, the loop continues to be taken up until the roll 84 is also lifted from its lower position, suitable stops being employed to normally limit the lower position of roll 84 to a higher plane than the lowermost position of the roll 85. When the roll of paper has been considerably reduced in diameter, its inertia becomes less and the weight of the two rolls 84, 85 might then be too great to prevent the feeding action from causing a jerk upon the supply roll. The lower roll 85 alone, however, has not sufficient weight to prevent being lifted up the inclines when the feed commences to act, and therefore the pull upon the supply roll is an easy and comparatively steady one.

The paper passes over the drum 83 and under a vertically movable series of rolls 87 (Figs. 4, 5 and 20) and then over a bed 88. The rolls 87 are mounted upon and so as to rotate with a shaft 89. The shaft 89 is mounted at its ends in arms 90 of a rockshaft 91, means being provided, as presently explained, for rocking said shaft 91 so that when the rolls 87 bear upon the paper, the web will be advanced to the severing mechanism. As best shown in Fig. 5, the rolls 87 have their apertures through which the shaft 89 passes sufficiently larger than said shaft to permit of a slight movement of the rolls relatively to said shaft, although the spline of the shaft will insure rotation of the rolls with said shaft. The object of having these separate rolls 87, all loosely but rotatably connected with their actuating shaft, is to avoid twisting of the paper if some portion of the paper should be thicker than other portions, such as might result from a crease in the paper. If a crease or other thickened portion of the paper passes under a roll 87, that roll will be lifted but will not result in lifting the other rolls. Consequently all the rolls 87 will bear upon the proper portions of the web even if the web is creased.

A pinion 92 of shaft 89 meshes with the gear 67 carried by the shaft 66 of the drum.

In order that the length of each wrapper section severed from the web shall accord with the particular loaf which is to be wrapped in that section, I provide the following mechanism: A feeler 93 is located in the path of movement of the upper portion of a loaf that is being carried by one of the pushers 48 into the path of the fingers 52. The front end of this feeler 93 is curved upwardly, as indicated by dotted lines in Fig. 14. Said feeler is pivoted at one end of the lever 94, the axis of said pivotal connection with said lever being parallel with the path of movement of the loaf that is passing under the feeler; so that if the top of the loaf is irregular, the feeler can rock so as not to bear only upon the highest portion of the loaf, which highest portion is liable to be quite small and would be crushed down if the feeler were to be rigid with its carrying lever.

The fulcrum 95 of the lever 94 is carried at the upper end of a swinging arm 96 pivotally supported at 97. An arm 98 is connected to the lever 94 by a vertical pivot 99, and is acted upon by a spring-pressed plunger 100 (Fig. 12) to yieldingly hold the arm 98 laterally or toward the feed drum. A suitable stop 101 is provided to hold the arm 98 normally in the position shown in Fig. 12. Practically, the arm 98, with the lever 94, constitutes a jointed lever, the fulcrum being at 95 and said fulcrum being movable so that the lever 94, 98 as a whole may be actuated in the direction of its length. By mechanism presently explained, the amount of longitudinal movement imparted to the jointed lever 94, 98 controls the length of the wrapper section that is severed from the web and placed in position to be wrapped around the individual loaf which acted upon the feeler 93. The means for actuating the lever 94, 98 in the direction of its length comprises a toothed rib 102 carried by the drum 83, the surface of the said rib which is toothed being cam-shaped, as indicated in Fig. 12. The end of the member 98 of the lever has a tooth 103 which is pointed, as shown in Fig. 7, and cam-faced on one side, as shown in Fig. 12. As has been stated, the drum 83 revolves continuously, and of course the rib 102 moves with it. If no loaf passes under the feeler 93, the tooth 103 will remain in substantially the position shown in Fig. 8 and above the position to be engaged by the rib 102, the end of said rib simply passing under the tooth. When a loaf, however, acts upon the feeler 93 to raise it, the tooth 103 is lowered more or less according to the height or vertical thickness of the loaf. The rib 102 is so positioned, and so curved in the direction of its length, that the larger the loaf to be wrapped, and consequently the lower the position to which the tooth 103 is shifted, the longer will be the coaction between the feeding drum and the movable rolls 87, as will be presently explained. In order that the tooth 103 may be kept in engagement with the rib 102 and then released therefrom at a predetermined point of movement of said rib, the member 98 of the jointed lever is provided with a shoulder 104 which rides against the inner face of a fixed upright 105 suitably secured to the frame of the machine. When the rib 102 has passed around from the position shown in Figs. 7 and 12 and the toothed face thereof has engaged said tooth 103, it pushes the hinged lever in the direction of the arrow in Fig. 7 until the shoulder 104 passes to the left of upright 105. When this point is reached, the inclined or beveled formation of the toothed face of the rib 102 acts upon the inclined or beveled face of the member 98 of the lever to swing said member 98 laterally upon its pivot 99 against the action of the spring plunger 100. Of course, after the rib 102 entirely passes the member 98 of the lever, the spring-pressed plunger acts to swing said member 98 inwardly again so that, through connections presently described, the jointed or compound lever 94, 98 can return to the position shown in Figs. 8 and 12. A particular reason for the disengagement of the tooth 103 from the rib 102 at a predetermined point, as just described, is to prevent the jointed lever from being pushed too far in the direction of the arrow in Fig. 7, which excessive movement would break the connections which we shall now proceed to describe.

Connected to the fulcrum 95 of the jointed lever is a link 106, so that the movement of said lever in the direction of the arrow (Fig. 7) will act through said link to swing a plate 107 which is pivotally supported at 108, said link being pivoted to the plate at 109. The plate 107 has a slot or opening 110 the lower edge of which is formed as a cam 111. A pin 112 projecting from one of the arms 90 (see also Fig. 20) enters the slot 110, the formation of which is such that when the parts are in the position shown in Fig. 8 the pin 112 is supported at the left of the cam 111 and consequently the shaft 89 carrying the upper feed rolls 87 is held elevated so as not to grip the paper. When the jointed lever 94, 98 is shifted toward the left in Fig. 7, the connection through the link 106 swings the plate 107 so as to carry the cam 111 under the pin 112 and permit the latter to drop into the lower portion of the slot 110, this motion being sufficient to let the upper feed rolls descend upon the paper on the drum 83. Of course, the quicker the drop of the upper feed rolls, and the longer the contact remains, the longer will be the extent of advance of the web, so as to increase the length of paper passed over the loaf which has acted upon the feeler 93. In order to return the plate 107 and the parts connected thereto, to the position shown in Fig. 7, a cam 113, carried by a shaft 114, acts upon a roll 115 carried by said plate 107. The plate 107 is provided with an arm 116 which constitutes a handle by means of which the attendant may swing the plate to cause paper to be fed through the machine without being under the control of the loaf.

As indicated in Figs. 4 and 5, the vertical passageway or chute has two walls of which the wall 117 may be rigid, said wall being, of course, vertically slotted for the passage of fingers 52. The other wall 118 is yieldingly supported, as by means of screws or pins 119 passing through a bracket 120, springs 121 being located between said bracket and wall.

The bed 88 is transversely slotted as at 122 (Figs. 5 and 20), and has short fingers 88$^a$ and long fingers 88$^b$ to support the end of the web that is fed forward past the knife, presently described, it being understood that the lifting fingers 52 pass upwardly through the rectangular space between the fingers 88$^b$ and in front of the fingers 88$^a$ in Fig. 20. These fingers of the bed occupy a horizontal position so as to momentarily support the section of paper that is cut off, under the control of the loaf that is just then being brought to position, so that the fingers 52 will lift that loaf and carry it upwardly through the vertical passageway or chute with the wrapper section draped over the loaf.

Rising from the frame of the machine at the opposite ends of the slot 122 are brackets 123 (Fig. 19), said brackets being connected by cross bars 124 (Fig. 5). Mounted to slide in vertical ways provided by the brackets 123 is a casting 125. Adjustably secured to said casting, as by screws 126, 127, is a knife-bar 128 carrying a knife 129. The lower edge of the knife is preferably serrated, as shown in Fig. 19, and said edge coacts with one edge of the slot 122 in shearing the web of paper.

To prevent the front edge of the web from catching upon the farther side of the slot 122 when said web is advanced I provide a movable edge-deflector which comprises a bar 130 having an inclined upper surface, as shown in Figs. 5 and 25. The deflector bar 130 is carried by pins 131 depending from the casting 125 so as to partake of the vertical movements of said casting. In Figs. 5 and 19 the parts are in the position which they occupy when the web is partly severed, or, in other words, the knife is neither in the upper nor lower extreme position. Of course, when the knife descends, the bar 130 moves downwardly; but when the knife rises to its upper extreme, it occupies a position which raises the bar 130 through the slot 122 to the position indicated in Fig. 25, so that the inclined upper face of said bar will guide the advancing edge of the web of paper when the next feed takes place so as to prevent said edge from catching upon the farther edge of the slot 122.

The casting 125 carrying the knife is vertically reciprocated by means of two arms 132 of a rockshaft 133 (Fig. 7), the ends of the arms 132 entering recesses 134 (Fig. 19) of the casting. One of the arms 132 has a pin provided with a roll 135 (Figs. 7, 8 and 10) which enters a cam groove 136 in a disk 137 carried by shaft 114. The cam disk 137 is not secured to the shaft 114 but is secured to a sleeve 138 loose on said shaft. The sleeve is confined between two collars 139, 140 which are secured to the shaft, the collar 140 having a peripheral notch 141 (Figs. 7 and 11). The cam disk 113 is mounted on the sleeve 138 adjacent the collar 140, and also mounted on the sleeve adjacent the cam disk 113 is a disk 142. The cam disk 113 is provided with two curved slots, as indicated in Fig. 7. A clamp bolt 143 passes through the disks 113 and 142 and by reason of the lower slot in the disk 113 the relative rotative positions of these two disks may be adjusted. A small rockshaft 144 passes through the upper slot of disk 113 and has at one end an arm 145 having a tooth 146, which coöperates with the notch 141 in a manner presently described. Said rockshaft has at its other end a radial projecting detent arm 147 having a suitable spring 148 (Fig. 11) so as to tend to actuate the detent 147 and the rockshaft to hold the tooth 146 against the surface of the collar 140.

The object of the construction just described is to avoid useless reciprocations of the knife when there is no feed movement of the web; and, as described, there is no feed of the web when there is no loaf approaching and acting upon the feeler 93. Coöperating with the detent 147 is a stop lever 149 pivotally supported at 150, conveniently to an extension of an arm 90, the lower end of said lever having a cam surface 151. A pin or roll 152 projecting laterally from the member 98 of the jointed lever, acts upon the cam 151 of the lever 149 when said member 98 moves downwardly, due to the passage of a loaf under the feeler 93. This oscillates the lever 149 to remove it from the path of motion of the detent 147. To explain this operation, it should be mentioned here that in Fig. 7 the detent 147 is not shown in its normal position of rest but as approaching that position. When the detent 147 contacts with the end of stop lever 149, the rockshaft 144 is oscillated so as to swing the tooth 146 out of the notch 141 of actuating collar 140. It being understood that the shaft 114, to which the collar 140 is secured, is constantly rotated, it will be apparent, of course, that when the arm 145 and its tooth 146 occupy the position shown in Fig. 7, the shaft 114, through said secured collar 140 and the arm 145, will rotate both of the disks 113, 142, and also the sleeve 138, because said disk 142 is secured to the sleeve, as by means of a screw 153 (Fig. 9). This rotation of the sleeve, of course, rotates the cam disk 137, and consequently causes the knife-bar to descend and rise again. One rotation of the sleeve 138 to effect this result is secured by the connections just described, because of the interengagement of the tooth 146 with the notch 141, this engagement being broken, however, as soon as the detent 147 contacts with the upper end of the stop lever 149. As soon as the stop lever has been shifted from the position shown in Fig. 7, the spring 148 (Fig. 11) rocks the shaft 144 to cause reëngagement of the said tooth and notch.

The shaft 114 is driven by means of a chain 154, indicated by dotted lines in Fig. 4, said chain being mounted upon sprockets 155, 156 carried respectively by the shafts 114 and 66.

We will now describe the pressers which hold the paper upon the bed 88, referring particularly to Figs. 4, 5 and 19. Mounted to slide vertically in ears of the casting 125 are four rods 157, two each side of the knife. The upper ends of the rods have stop nuts 158, and their lower ends have pads or feet 159 preferably of elastic material such as rubber. Springs 160 coiled upon the rods 157 between enlargements at the lower ends thereof and the ears of the casting, cause the feet to bear yieldingly upon the paper when the casting descends, the said rods and the feet being lifted, of course, when the casting rises by contact of the ears of the casting with the stop nuts 158. When the knife descends, the four presser-feet 159 serve to hold not only the rear portion of the section which is cut off but also the front portion of the remaining web so as to avoid any shifting of either the cut-off section or the web due to the action of the descending knife.

An auxiliary presser-foot 161 (Figs. 5 and 20) is employed to hold the web when the knife and the pressers carried thereby are raised, and when no feed is taking place. At such time, and of course with the upper feed rolls 87 raised, the weight of the tension rods 84, 85, or either of them, in the loop of paper would be liable to draw the web backwardly. Therefore said presser-foot 161 is caused to bear upon the paper when the feed rolls 87 are raised. Said presser-foot 161 is carried by the lower end of a spring-pressed plunger carried by an arm 162 forming part of a clamp 163 secured to rockshaft 91 in such manner that when the rockshaft 91 is actuated as hereinbefore described and occupies the position with its arms 90 as shown by Fig. 7, the presser-foot 161 is lowered; but when the pin 112 shown in Fig. 7 occupies the lower portion of the slot 110, and the upper feed rolls 87 are lowered, the consequent movement of the rockshaft lifts the presser-foot 161 from the paper to permit the feed thereof. As indicated in Fig. 20, the presser-foot 161 occupies a substantially central position transversely of the machine, to bear upon the middle portion of the web. Therefore, when the presser-foot 161 is bearing upon the paper, if it has become twisted or askew or tends to assume such position, the gravity tension roll or rolls 184, 185 will straighten the paper out. The liability of the web not being located straight in the machine is greater when the web is being first introduced by the attendant. In order that the said presser-foot 161 may be temporarily lifted manually, the stem of the plunger which carries said foot extends up through the socket of the arm 162 and is pivotally connected at 164 to a hand lever 165 having a fulcrum in an ear 166 of the upper member of the clamp 163. When the machine is being first supplied with paper or being "threaded up," the attendant, by means of the hand lever 165, lifts the auxiliary central presser-foot 161 and pushes the end of the web through and under the knife and then releases the hand lever. If then the paper is somewhat askew, a backward reeling-up motion of the supply roll will lift one or both of the gravity tension rods if they are already in contact with their lower stops, and cause said rods to coact with the centrally located presser-foot 161 to straighten the paper.

We will now describe the means for folding the wrapper about the loaf, it being understood that a section of the material has been cut off and is resting upon the fingers of the bed 88 in position to be draped over by the loaf that is being elevated by fingers 52. As shown in Figs. 5 and 14, a plate 167 is hingedly supported at 168, said plate being, of course, in position between the top of the rising loaf and the wrapper section. As the loaf rises, it swings the plate 167 upwardly so as to smooth out the flap of the wrapper that is being drawn inwardly below the wall 118 as the loaf rises. The primary end folders 169 extend upwardly along opposite ends of the vertical passageway or chute, and are pivoted at 170 to blocks 171 carried by stems 172 adjustably supported by the frame of the machine. The upright portion of each folder 169 is pressed inwardly by a spring-actuated pin 173 mounted on block 171 to the limit prescribed by the toe 174 of the folder adapted to contact with the stem 172. These folders 169 act upon the wrapper as it and the loaf rise, to fold the wrapper to the position shown in Fig. 26.

Secondary folders 175 pivotally supported at 176 (Fig. 14) are laterally shaped as shown in Fig. 15 so that said folders will act upon portions of the wrapper to fold those portions to the position indicated in Fig. 27.

A third pair of folders 177, pivotally supported at 178 (Fig. 14), have their inner ends laterally shaped as shown in Fig. 15 to next fold the wrapper to the form shown in Fig. 28.

All the folders 169, 175 and 177 are so mounted that their acting portions move or yield relatively to the ends of the loaf so as to compensate for irregularity in formations, such as overhanging upper portions of a loaf, the tips of the folders being above the pivotal points so that if a loaf having an enlarged top is being elevated between the folders, the end folds of the wrapper will be carried inwardly singly against the portions of the loaf which were accurately shaped by the baking pans.

After the wrapper has been acted upon by the third pair of folders 177, a side flap tucker 179 folds the wrapper to the position shown in Fig. 29. The tucker 179 comprises a plate which may be slotted as shown in Fig. 16, said plate being carried by a rod 180 pivotally supported on the outer ends of two slides 181, the said plate or tucker 179 being guided on a crossbar (Fig. 4) at the upper end of the wall 117. These slides are reciprocated by the following mechanism: The shaft 63 has two disks 183 each having a cam groove 184 (Fig. 17) which receives a roll carried by a lever 185 pivotally supported at 186 and having its lower end connected by a link 187 with a slide 181. The slides are mounted to reciprocate in suitable ways provided by brackets 188 (Fig. 16) secured to the frame 40 of the machine.

Instantly following the operation of the tucker 179, there are two end tuckers 189 which fold the wrapper to the form shown in Fig. 30. The end tuckers reciprocate toward and from each other. Each tucker plate 189 is mounted upon a block 190 (Fig. 18) mounted in a laterally inclined slideway in an extension 191 of bracket 188. Said extension is slotted to permit the operation through it of a pin 192 depending from the block 190 or the slide carrying said block, the said pin 192 being connected by a link 193 (Figs. 16, 17 and 18) with an arm 194 of a sleeve rockshaft 195 mounted on a vertical stud. Each rockshaft has another arm 196, but the arm 196 of one rockshaft projects in one direction, while the arm 196 of the other rockshaft projects in another direction, as shown in Fig. 16. One of the arms 196 is connected by a link 197 with a lever 198 pivoted at 199 and having a pin provided with a roll engaging a cam groove in a cam hub 200 secured to the shaft 114. A link 201 connects the pivotal point of lever 198 to link 197 with the arm 196 of the rockshaft at the other side of the machine, so that the action of the cam 200 will cause the end tuckers 189 to simultaneously approach each other and simultaneously return outwardly.

The folding of the last or bottom flaps so as to give the wrapper the form shown in Figs. 31 to 35 inclusive, by the removal of the loaf over the top of the wall 118 toward the sealing mechanism, results in the last or bottom flap being folded underneath. Carried by the upper end of the yieldingly mounted wall 118 (Figs. 5 and 15) is a roll 202, the trunnions of which are mounted in inclined slots in ears 203 rising from said wall 118. The inclination of the slots in the ears 203 is such that normally the roll 202, which is preferably roughened, as indicated in Figs. 13 and 14, occupies the position shown in Figs. 5 and 15. As the loaf is pushed upwardly, said roll 202 yields, but drops back under the edge of the wrapped loaf just before the elevating fingers 52 drop away from the bottom of the loaf as hereinbefore described. Said roll 202 therefore acts as a detent or temporary support to prevent any liability of a loaf dropping when the supporting and carrying fingers 52 leave it. Immediately after the fingers 52 have so left the loaf, said loaf is moved along over the sealing mechanism. Before describing said sealing mechanism, however, I will explain that the folded ends of the loaf are gripped with a yielding pressure so as to aid in preventing downward movement of the loaf after the elevating fingers leave it, and to also preserve a pressure against the end portions of the loaf until it has advanced well along to the sealing mechanism and until the next loaf has been raised by the next fingers 52. The devices for performing this function comprise two bars 204 (Figs. 2, 3 and 4) having pins 205 projecting outwardly through guiding apertures in fixed longitudinal ribs 206 which are flaring, as shown in Figs. 22 and 23. Springs 207 on said pins normally press the bars 205 toward each other to a limit prescribed by suitable heads or knobs on the ends of the pins which project through the ribs 206. The ends of the bars 204 at the left of Fig. 3 are provided with cam faces 208. These cam faces are acted upon by portions of the top pushers, presently described, to separate the bars 204 temporarily so that there will be no liability of the ends of the loaf issuing from the top of the chute scraping against said bars, thus allowing for free access of the loaf to the space between said bars. The ends of the cam faces terminate abruptly, as indicated in Fig. 2, to permit the said bars to be moved again toward each other after a rising loaf has entered between them.

The top carrier which takes each wrapped loaf, after it arrives above the roll as described, comprises chains 209 (Figs. 1, 2, 3 and 4) mounted at one end upon sprockets 210 secured to shaft 63 and at the other end upon sprockets 211 secured to a shaft 212. Connecting the two chains 210 at intervals are transverse bars 213 having pushers 214, each end of each pusher being provided with a vertical roll 215. As each pusher approaches position to transfer a wrapped loaf over the roll 202, the end rolls 215 of that pusher act upon the cam faces 208 of the bars 204 to spread said bars apart to permit the loaf to rise between said bars and in front of the approaching pusher.

An especial advantage of this machine is that the wrapped loaf is at no time relieved from equal pressure sufficiently distributed over it to hold the wrapper smoothly when it is leaving the top of the vertical chute and moving toward and to the sealing mechanism. Owing to the fact that the elevating mechanism comprises a plurality of fingers 52 in a group instead of a single plate, I am able to distribute the support for each loaf over a considerable lateral area to properly press against the bottom of the loaf, and yet without providing any large opening for the retreat of said fingers. The rigid wall 117 of the vertical passageway of the chute is provided with slots, as shown in Fig. 2, for the upward travel of the fingers, and a portion of said wall projects above the plane (Fig. 5) of operation of the tucker 179 so as to retain a hold upon the wrapped loaf even after it has reached its uppermost position prior to being taken by a pusher 214 and carried toward the sealer.

In order that each loaf shall be caused to be pressed downwardly to a practically uniform degree upon the sealing table, presently described, and the wiping apron beyond said bed, we provide a weight 216 to bear on each loaf, as best illustrated in Fig. 4. Each weight 216 is pivotally connected to an ear rising from a transverse bar 213, and has a toe 217. Secured to the pivot shaft 186 is a cam 218. When a toe 217 contacts with the cam 218, said toe is depressed to ride under the cam, resulting in lifting the weight 216 and keeping the weight elevated until the pusher to which it is connected has advanced a loaf away from the top of the chute and carried said loaf onto a firm support capable of sustaining the loaf so that the weight will hold it down. As each toe 217 leaves the under side of the cam 218, the weight 216 drops upon the loaf, and of course moves along with it and retains its pressure thereon until the loaf is discharged as hereinafter described. The firm support just referred to is provided by the upper surface 219 of the sealing table which is hollow and kept heated by suitable means such as steam connections with the space below the surface 219. A depression or pocket 220 in the sealing table is filled with suitable absorbent material such as felt covered by a reticulated layer 221 which may be a fine wire-mesh fabric. A perforated pipe 222 for a supply of suitable material, such as melted paraffin, leads into the pocket 220. The filling in the pocket is of an elastic nature, so that, owing to its being kept practically saturated with the paraffin, it will yield as each loaf passes over it, so as to act somewhat as a sponge to squeeze out some of the paraffin and apply it to the under surface of the wrapped loaf, which under surface carries the overlying flaps of paper as indicated in Fig. 32, so as to seal said flaps as soon as the article cools, as presently described.

Suitably mounted below the right-hand portion of the sealing table shown in Fig. 4 is a receptacle or tank 223 (Figs. 1, 21 and 23), said tank having a horizontal heating chamber 224 with a rib-shaped dome 225 extending up into the tank to aid in keeping the contents of the tank melted. A supply of paraffin can be deposited in the tank in any suitable manner. To supply the sealer in the pocket 220 from said tank, we employ suitable pump mechanism, such as illustrated in Figs. 21, 23 and 24. Within a lateral extension of the tank 223 is a casing 226 containing intermeshing toothed members 227. Admission to the space is provided by a port 228. Opposite said port is a pipe 229 which connects with the perforated section of pipe 222. One of the toothed members 227 is mounted to rotate with a vertical shaft 230 having a pulley 231 driven by a belt 232 from a pulley 233 on a shaft 234 supported by ears 235 connected with the sealing bed. Any surplus supply of melted paraffin, due to more than sufficient operation of the pump or due to the fact that no wrapped loaves are traveling over the applier 221, is taken care of by overflowing into gutters 236 (Figs. 21, 22 and 23) from which it flows through apertures 237 into lower gutters 238. The gutters 238 incline, as best shown in Fig. 1, toward a transverse trough 239 (Fig. 4) which has a bottom opening for delivering into the tank 223.

It will be understood, of course, that the last folding operation resulting from the transfer of the loaf toward the sealing table results in the bottommost flap extending rearwardly under the loaf, and consequently this flap is ironed out as it is pushed along over the upper surface of the sealing table. As has been mentioned, the sealing table is kept hot. In practice, it is kept at such a temperature that the melted paraffin, or other suitable sealing material, will not only be thoroughly distributed by means of the wick in pocket 220 but will cause sufficient saturation of the undermost flaps to cause the overlapping flaps to adhere firmly. Of course, the mesh covering 221 is normally held by the wick material below it slightly above the plane of the passage of the bottom of the wrapped loaf so that the pressure, as the loaf passes over the pocket 220, will press the mesh covering 221 down to cause the melted wax to exude as hereinbefore described. As shown in Fig. 21, the upper surface of the sealing table or a portion thereof is formed with laterally inclined grooves 240. These grooves act upon the bottom flap to work aside surplus paraffin and also smooth out the bottom flap from the middle toward the ends so as to aid in imparting a smooth finish to the sealed bottom of the loaf. To aid in preserving the smooth condition of the bottom folds of the wrapped loaf after it leaves the sealing table, we employ a belt 241 the upper surface of which is constantly traveling rearwardly or in a direction opposite to the direction of movement of the loaves, said belt being open to the atmosphere and of sufficient length to permit sufficient cooling of the paraffin wax while the wrapped loaf is being pushed along by the pushers 214 over said belt 241. Said belt is mounted upon rolls one of which is carried by a shaft 234 and the other by a shaft 242. The shaft 242 is driven by suitable gearing from the shaft 212 as indicated in Fig. 1, the belt 241 acting upon the roll of shaft 234 so as to cause pulley 233 to actuate the pump through the belt 232. The belt 241 is made of suitable material, such as canvas, which will to some extent act as an absorbent so that when the wrapped loaf leaves the heated sealing table and is pushed onto said belt 241, the surplus melted wax will be immediately wiped off by said belt.

Owing to the fact that the sealed flaps are quickly cooled while upon the belt 241, considerable paraffin wax becomes caked upon said belt. To remove this caked material we provide a scraper 243 (Fig. 4) suitably secured in position to act upon the under surface of the belt 241 to remove said material and permit it to drop into the tank 223. The direction of motion of the belt 241 is indicated by an arrow in Fig. 4.

The pushers 214 deliver the wrapped loaves onto a belt 244 which travels in the direction of the arrow in Fig. 4ª, said belt being mounted on rolls 245, 246 and delivering the loaves onto the final delivery carrier belt 247 one end of which is mounted on a roll 248. The mechanism shown in Fig. 4ª is to be supposed to be at the right of Fig. 4, the employment of the two figures being necessitated by their scale and the size of the sheet. Gears 249, 250, indicated by dotted lines in Fig. 4ª, are of such sizes relatively to each other and to the gearing with shaft 212 that the belt 244 is driven considerably faster than the speed of the pushers 214, so that the instant that a wrapped loaf is delivered by a pusher 212 onto belt 244, the latter takes the loaf away before the direction of motion of that pusher in an upward direction around shaft 212 can "kick" the loaf over. Without such provision of the faster moving belt 244, the pusher would be liable to "kick" or roll the loaf over on its side. Said belt 244 therefore serves to insure uniform delivery of the loaves onto the carrier 247 with their flat bottoms supported thereon. In order that this last belt may move slower so that the loaves placed thereon will be in close array, to facilitate their removal by an attendant for packing, the shafts of the rolls 246, 248 are connected by speed-reducing gearing such as indicated at 251, 252, 253, 254, in Figs. 4ᵇ and 4ᶜ. This gearing is, in fact, so proportioned that the belt 247 carries the wrapped loaves away almost in contact with each other, and the said belt 247 is, in practice, of such length as to permit an attendant to leave it for a sufficient length of time to deposit a supply of un-wrapped loaves on the loading belt 41 (Figs. 1ª and 3). It is therefore quite feasible for one person to attend to both supplying and removing the loaves. Referring now to Figs. 1ª and 2, the belt 41 is supposed to be of such length that the attendant, leaving the belt 247 for a time, can place on belt 41 a large number of un-wrapped loaves in close array, and then go back to belt 247. As the belt 41 travels continuously, the loaf that is at the head of the series and that is arrested by the stop wall 44 in position to be introduced into the machine by the transversely moving pushers 48, would be subjected to great lateral pressure due to the friction of the belt 41 pushing the other loaves up against it, if the loading belt were continuous to the stop wall. To prevent this, we may employ an intermediate, faster moving, relatively short belt 255, one end of which is mounted on roll 42 and the other on a roll carried by a shaft 256. The adjacent end of belt 41 is mounted on a roll carried by a shaft 257. The two shafts 256, 257 are connected by compound gearing 258, 259, 260, 261 (Fig. 1ᵇ) so that, while the belts 41, 255 travel in the same direction, the latter moves faster to speed up the movement of the loaves to draw the loaves singly away from those behind it and quickly present each loaf to the stop wall 44 without having any pressure exerted upon it by the loaves on belt 41. As soon as each loaf arrives against stop wall 44, it is taken into the machine by a pusher 48. A bridge 262 rising from a support 263 (Fig. 1ª) between the belts 41, 255 prevents the loaves from "toppling over" as they pass from one to the other.

When the advancing edge of the web of paper is being advanced over the paper bed 88 by the feed rolls, the motion is so rapid that it is desirable to render it certain that the paper shall be held flat upon said bed. To this end we may provide a series of fingers 264 (Figs. 5 and 20) which bear lightly upon the paper but are free to yield if any wrinkle or thick spot in the paper should come in contact with them. They are loosely pivoted to a transverse rod 265 near the slot for the knife, said rod being suitably supported at its ends so that it may be vertically adjusted if different thicknesses of paper are being used. Of course, these fingers 264 terminate short of the path of movement of the knife. In order to similarly act upon the paper and guide it between the knife and the wall 118 of the vertical chute, similarly acting fingers 266 may be suitably connected with the lower end of the wall 118. (Fig. 15 and dotted lines in Fig. 20). We prefer, however, to prevent deflection of the paper by means such as the two guides 267 above the table or bed arms 88ᵇ, as shown in Figs. 4, 5, 36 and 37, said guides having upturned ends 268 to enable the edge of the paper to enter under them. The guides are laterally movable and are actuated to occupy about the positions shown in Fig. 37 when the paper is being fed under them, and to occupy about the positions shown in Fig. 36 when the wrapper section has been cut off and a loaf rises under that section. This shifting prevents the guides from interfering with the proper draping of the paper over the loaf as it rises.

The guides 267 are fixed to the inner ends of two slides 269 mounted in ways formed in brackets 270 suitably supported by the frame of the machine. Links 271 connect the slides with levers one of which, 272, is pivoted at 273. A long link 274 connected to the lever 272 is pivotally connected at 275 to a lever 276 which is pivotally connected at 277 to the link 271 of the other slide. As shown these parts are so constructed and arranged that actuation of lever 276 causes the guides 267 to simultaneously move toward each other or a part as indicated by comparing Figs. 36 and 37. The lever 276 is pivoted at 278 and has an arm 279 engaging an eye 280 at one end of a link 281 the other end of which (see Fig. 38) is pivoted at 282 to the lower end of a lever 283 pivotally supported at 284. The upper end of the lever 283 has a roll 285 engaging a cam groove 286 in a disk 287 carried by shaft 114. The cam is so designed that when the machine is in operation the guides 267 are adjusted close enough together to overlie the marginal portions of the paper when the latter is being advanced to be cut off, and then shifted apart to positions beyond the edges of the paper just before the section which has been cut off by the knife is lifted by the rising loaf that is to be wrapped in that section.

We claim:

1. A wrapping machine having four continuously and successively operating carriers, the first for receiving the articles in juxtaposition, the second carrier having means for taking the articles from the first, means being provided for spacing the articles before they are taken by the second carrier, to avoid lateral compression of the articles as they start in their second direction of travel, the third carrier having means for taking the articles from the second and means adjacent the third carrier for folding wrappers around the articles while in transit, the fourth carrier having means for taking the wrapped articles from the third and delivering them from the machine.

2. A wrapping machine having four continuously and successively operating carriers, the first for receiving the articles in juxtaposition, the second carrier having means for taking the articles from the first, means being provided for spacing the articles before they are taken by the second carrier, to avoid lateral compression of the articles as they start in their second direction of travel, the third carrier having means for taking the articles from the second and means adjacent the third carrier for folding wrappers around the articles while in transit, the fourth carrier having means for taking the wrapped articles from the third and delivering them from the machine, means being provided for sealing the wrappers while in transit under the influence of the fourth carrier.

3. A wrapping machine having a passageway or chute provided with folders to act on the wrapper, fingers extending transversely of the chute to support articles fed to position in said chute, and a set or group of elevating fingers spaced or separated from each other to pass through the spaces between said fingers.

4. A wrapping machine having a passageway or chute provided with folders to act on the wrapper, and an endless series of groups or sets of elevating fingers, the fingers of each group being spaced apart to engage different portions of the lower surface of the article raised by that group.

5. A wrapping machine having a passageway or chute provided with folders to act on the wrapper, and a set or group of elevating fingers spaced or separated from each other to engage different portions of the lower surface of the article being wrapped, one of the walls of said chute having slots for the passage of said fingers.

6. A wrapping machine having a chute provided with folders to act on the wrappers, a series of flexibly connected rods having fingers for engaging and elevating the articles to be wrapped, each rod having an arm, a cam track to be engaged by said arm, said track having an offset portion, and a switch cam to coöperate with said offset to cause the rods and their fingers to swing.

7. A wrapping machine having a chute provided with folders to act on the wrappers, a series of flexibly connected rods having fingers for engaging and elevating the articles to be wrapped, each rod having an arm, a cam track to be engaged by said arm, said track having an offset portion, and a switch cam to coöperate with said offset to cause the rods and their fingers to swing, said cam track having means at another point for returning the rods and their fingers to normal position.

8. A wrapping machine having mechanism for automatically determining the size of each wrapper by the size of the article to be inclosed in that wrapper, said mechanism including a drum and a roll movable toward and from the drum to intermittently feed a web of paper, a cutter, a cam rib carried by the drum, a longitudinally movable lever having one end projecting into the path of movement of the articles to be wrapped and having its other end adapted to be acted upon by said cam rib, and means for varying the time of contact between the feed drum and roll, according to the oscillatory position of said lever.

9. A wrapping machine having mechanism for automatically determining the size of each wrapper by the size of the article to be inclosed in that wrapper, said mechanism including a drum and a roll movable toward and from the drum to intermittently feed a web of paper, a cutter, a cam rib carried by the drum, a longitudinally movable jointed lever having one end projecting into the path of movement of the articles to be wrapped and having its other end adapted to be acted upon by said cam rib, and means for varying the time of contact between the feed drum and roll, according to the oscillatory position of said lever.

10. A wrapping machine having mechanism for automatically determining the size of each wrapper by the size of the article to be inclosed in that wrapper, said mechanism including a drum and a roll movable toward and from the drum to intermittently feed a web of paper, a cutter, a cam rib carried by the drum, a longitudinally movable jointed lever having one end in the path of movement of the articles to be wrapped, the other end of the jointed lever being in the path of movement of said cam rib, a link connected to said jointed lever, a pivoted plate having a cam slot, said plate being connected with said link, and means controlled by said cam slot for controlling the contact of the feed drum and roll.

11. A wrapping machine having mechanism for automatically determining the size of each wrapper by the size of the article to be inclosed in that wrapper, said mechanism including a drum and a roll movable toward and from the drum to intermittently feed a web of paper, a cutter, a cam rib carried by the drum, means actuated by said cam rib for varying the duration of contact between the drum and roll, and means for preventing operation of the cutter when the drum and roll are separated.

12. A wrapping machine having mechanism for intermittently feeding a web of paper, a cutter for severing the paper, means for controlling the operation of the feed according to the size of the article to be wrapped, and means for simultaneously controlling the operations of the cutter and feed.

13. A wrapping machine having a chute or passageway, means for elevating articles through said chute, folders for inclosing the articles in wrappers while in transit through said chute, and a side flap tucker at the upper end of said chute, said tucker comprising a rod, slides pivotally supporting said rod, a plate projecting from said rod, and a crossbar over which said plate slides.

14. A wrapping machine having a guiding chute provided with folders one above the other, said folders being independent of the guiding portions of the chute, a pair of oppositely disposed sliding tuckers at the upper end of the chute, means for simultaneously actuating said tuckers, an endless series of lifters, and means for moving said lifters continuously through the chute between said folders.

15. A wrapping machine having a guiding chute provided with folders one above another, said folders being independent of the guiding portions of the chute, a sliding tucker to engage a side flap of the wrapper, a pair of oppositely disposed sliding tuckers to engage end flaps of the wrapper, said tuckers being transversely of the chute at the upper end thereof, means for simultaneously actuating said tuckers, and an endless series of lifters movable through the chute between the folders and tuckers.

16. A wrapping machine having a chute provided with folders to act on the wrappers, a pair of oppositely disposed tucker plates at the upper end of the chute, guides for said plates, rockshafts connected to said plates to reciprocate them, and means for simultaneously operating said rockshafts to cause the plates to approach and recede from each other.

17. A wrapping machine having a chute provided with folders to act on the wrappers, a pair of oppositely disposed tucker plates at the upper end of the chute, guides for said plates, rockshafts connected to said plates to reciprocate them, a link connected to one of said rockshafts to actuate it, a lever connected to the other end of said link, and a link connecting said lever with the other rockshaft.

18. A wrapping machine having a vertical passageway or chute, carriers and folders for inclosing articles in wrappers during transit through said chute, a bodily movable detent at the top of the chute, said detent normally occupying a position partially in the path of movement of the article from the top of the chute and adapted to be pushed aside by a passing article and to automatically return to said normal position, and means for transferring the inclosed articles over said detent.

19. A wrapping machine having a vertical passageway or chute, carriers and folders for inclosing articles in wrappers during transit through said chute, a sealing table, carriers for transferring the inclosed articles over said table, and a yieldingly mounted roller detent for preventing return movement of the articles into the chute.

20. A wrapping machine having a vertical passageway or chute, folders for operating on a wrapper on an article in said chute, lifters for raising the articles and wrappers through the chute, said lifters being continuously movable in one direction through the chute, means being provided for dropping the lifters when they reach the upper end of the chute, a transferring carrier movable across the upper end of the chute, and a roller detent for preventing return of each article when its lifter leaves.

21. A wrapping machine having a vertical passageway or chute, folders for operating on a wrapper on an article in said chute, lifters for raising the articles and wrappers through the chute, means being provided for dropping the lifters when they reach the upper end of the chute, a transferring carrier movable across the upper end of the chute, a loosely mounted roller at the upper end of one side of the chute, and inclined bearings for normally supporting the roller in position to be pushed upwardly and aside by an article passing it.

22. A wrapping machine having a passageway or chute, a continuously movable carrier for transferring the articles to be wrapped through said chute, folders for inclosing the articles in wrappers while in transit through said chute, a continuously movable carrier for transferring the articles laterally from the upper end of the chute, and means for yieldingly holding the end portions of the wrapped article when it is moved laterally.

23. A wrapping machine having a passageway or chute, a continuously movable carrier for transferring the articles to be wrapped upwardly through said chute, folders for inclosing the articles in wrappers while in transit through said chute, a continuously movable carrier for transferring the articles laterally from the upper end of the chute, and means for yieldingly holding the end portions of the wrapped article when it is moved laterally, said means comprising two bars having springs for normally holding them toward each other.

24. A wrapping machine having a passageway or chute, means for carrying the articles to be wrapped upwardly through said chute, folders for inclosing the articles in wrappers while in transit through said chute, a carrier for transferring the articles laterally from the upper end of the chute, and means for yieldingly holding the end portions of the wrapped article when it is moved laterally, said means comprising two bars having springs for normally holding them toward each other, means being provided for spreading said bars apart to permit the loaf to rise between the bars.

25. A wrapping machine having a passageway for the articles to be wrapped, a carrier for conveying the articles through said passageway, means for folding wrappers around the articles while in transit through said passageway, a wrapper-sealing appliance, means for transferring the wrapped articles from the said passageway to the sealing appliance, and means for retaining substantially equal pressure upon the folded portions of the wrapper to hold said portions when the wrapped article leaves the passageway and moves toward the sealing appliance.

26. A machine having folders for inclosing articles in wrappers, a sealing table, a carrier for moving the wrapped articles over said table, and pressers bodily movable with said carrier for increasing the bearing of the wrapped articles on said table.

27. A machine having folding mechanism for inclosing articles in wrappers, a sealing table, an endless carrier having pushers for transferring the wrapped articles from the folding mechanism to and over said table, individual pressers connected to the pushers for increasing the bearing of the articles on said table, and means for holding the pressers out of operative position during transfer of the articles onto the table.

28. A machine having folders for inclosing articles in wrappers, a sealing table, an endless carrier having pushers for moving the wrapped articles over said table, and individual pressers connected to the pushers for increasing the bearing of the articles on said table, said pressers comprising weights pivotally connected with said pushers.

29. A machine having folders for inclosing articles in wrappers, a sealing table, an endless carrier having pushers for moving the wrapped articles over said table, and individual pressers connected to the pushers for increasing the bearing of the articles on said table, said pressers comprising weights pivotally connected with said pushers, means being provided for holding said weights raised when the articles are first advanced by the pushers.

30. A machine having folders for inclosing articles in wrappers, a sealing table, an endless carrier having pushers for moving the wrapped articles over said table, weights pivotally connected with said pushers, said weights having arms, and a cam located in the path of movement of said arms to hold the weights raised when the articles are first advanced by the pushers.

31. A machine having folders for inclosing articles in wrappers, a table, a carrier for moving the wrapped articles over said table, and a wick having a mesh covering for applying sealing material to the portions of the wrappers moving along the table.

32. A machine having folders for inclosing articles in wrappers, a table having a pocket, a carrier for moving the wrapped articles over said table, yielding wick material in said pocket, and a mesh covering over said wick material.

33. A machine having folders for inclosing articles in wrappers, a table having a pocket, a carrier for moving the wrapped articles over said table, yielding wick material in said pocket, a mesh covering over said wick material, and means for supplying said wick material with sealing material.

34. A machine having folders for inclosing articles in wrappers, a table having a pocket, a carrier for moving the wrapped articles over said table, yielding wick material in said pocket, a mesh covering over said wick material, and means for supplying said wick material with sealing material, said means including a pump and a reservoir for the sealing material.

35. A machine having folders for inclosing articles in wrappers, a table having a pocket, a carrier for moving the wrapped articles over said table, yielding wick material in said pocket, a receiver below the table, means for conducting surplus sealing material from the table to the receiver, and a pump and connections for supplying the pocket and wick with sealing material from said receiver.

36. A wrapping machine having means for supplying melted wax to the wrapped articles, a sealing table, a carrier for pushing the articles along the table, and means for laterally deflecting surplus wax and smoothing out the portion of the wrapper that is in sliding contact with the table.

37. A wrapping machine having means for supplying melted wax to the wrapped articles, a sealing table, a carrier for pushing the articles along the table, and means for laterally deflecting surplus wax and smoothing out the portion of the wrapper that is in sliding contact with the table, said deflecting means comprising laterally inclined grooves in the table.

38. A wrapping machine having means for inclosing an article in a wrapper with one flap or edge portion of the wrapper overlying other portions, a traveling wiper for smoothing out the overlying flap, and means for moving the wrapped article in a direction opposite to the direction of movement of the wiper, means being provided whereby the wrapped article is prevented from rotating as it moves along, whereby the wiping or smoothing out action is confined to the overlapped portion of the wrapper.

39. A wrapping machine having means for inclosing an article in a wrapper with one flap or edge portion of the wrapper overlying other portions, means for sealing the overlying flap, and a wiper for smoothing out the sealed flap.

40. A wrapping machine having means for inclosing an article in a wrapper with one flap or edge portion of the wrapper overlying other portions, means for applying heated wax to the overlying flap, and means for removing surplus sealing material from said flap.

41. A wrapping machine having folders for successively folding different portions of the wrapper, a sealing table, a carrier for moving the wrapped article over said table, and a wiper for acting on the outermost flap of the wrapper after it leaves the sealing table.

42. A wrapping machine having folders for successively folding different portions of the wrapper, a sealing table, a carrier for moving the wrapped article over said table, a movable wiper for acting on the outermost flap of the wrapper after it leaves the sealing table, and means for moving said wiper in a direction opposite to the direction of movement of the carrier.

43. A wrapping machine having means for inclosing an article in a wrapper with one edge portion of the wrapper overlying other portions, an endless-belt wiper for acting upon the wrapper, means for moving said belt in a direction opposite to the direction of movement of the carrier, and a carrier having means for sliding the wrapped articles over said wiper.

44. A wrapping machine having means for inclosing an article in a wrapper with one flap or edge portion of the wrapper overlying other portions, means for applying sealing material to the wrapper, an endless belt wiper for acting on the wrapper after the application of sealing material, a scraper for removing sealing material from the belt, and a receiver for the scrapings.

45. A wrapping machine having a continuously movable loading or supply belt carrier movable in one direction, introducing mechanism movable in another direction for causing the articles to be wrapped to enter the machine, and means for increasing the spacing of the articles before they are transferred from the loading carrier into the machine.

46. A wrapping machine having a continuously movable loading or supply belt carrier movable in one direction, introducing mechanism movable in another direction for causing the articles to be wrapped to enter the machine, and a continuously movable belt carrier intermediate the loading carrier and the introducing mechanism, said intermediate carrier having means for causing it to travel at a higher speed than the loading carrier.

47. A wrapping machine having means for assembling wrappers and articles to be wrapped therein, wrapper-folding mechanism, a continuously operating supply carrier for the articles movable in one direction, means for increasing the spacing between the articles, and a carrier movable in another direction transferring them from the supply carrier to position to be wrapped.

48. A wrapping machine having a loading carrier and a delivery carrier mounted to move in substantially parallel paths, means for actuating them in opposite directions, and a higher speed carrier intermediate each of them and the machine, whereby the receiving and delivering ends of the first mentioned carriers may be in such proximity that one attendant may supply and remove the articles without liability of the machine injuring or disarranging the articles.

49. A machine having folders for inclosing articles in wrappers, a table for the wrapped articles, pushers movable over the table, and weights pivotally connected with the pushers and adapted to press the articles on the table.

50. A wrapping machine having a passageway for articles to be wrapped, means for introducing wrapping material across said passageway, fixed supports for the material, guides for preventing deflection of said material as it advances across the passageway, said guides being above the fixed supports, and means for automatically shifting said guides beyond the edges of the wrapping material at predetermined times.

51. A wrapping machine having a passageway for articles to be wrapped, a continuously moving carrier for lifting articles through said passageway, means for directing wrapping material across said passageway, said means comprising a support for one side of the material and laterally movable guides for the other side of the material, and means for draping the wrapping material over each article as it is lifted.

52. A wrapping machine having a passageway for articles to be wrapped, a continuously moving carrier for lifting articles through said passageway, means for directing wrapping material across said passageway, said means comprising a support for one side of the material and laterally movable guides for the other side of the material, means for draping the wrapping material over each article as it is lifted, and means for intermittently shifting said guides toward and from each other.

In testimony whereof we have affixed our signatures in presence of two witnesses.

HENRI A. SEVIGNE.
FRANK K. ARNOLD.

Witnesses:
JOHN C. KENNEDY,
ROBERT BAIRD.